Nov. 3, 1959  G. DE GELLEKE  2,911,071
FLUID PRESSURE ACTUATED OPERATOR FOR A DISK BRAKE
Filed April 27, 1956  3 Sheets-Sheet 2
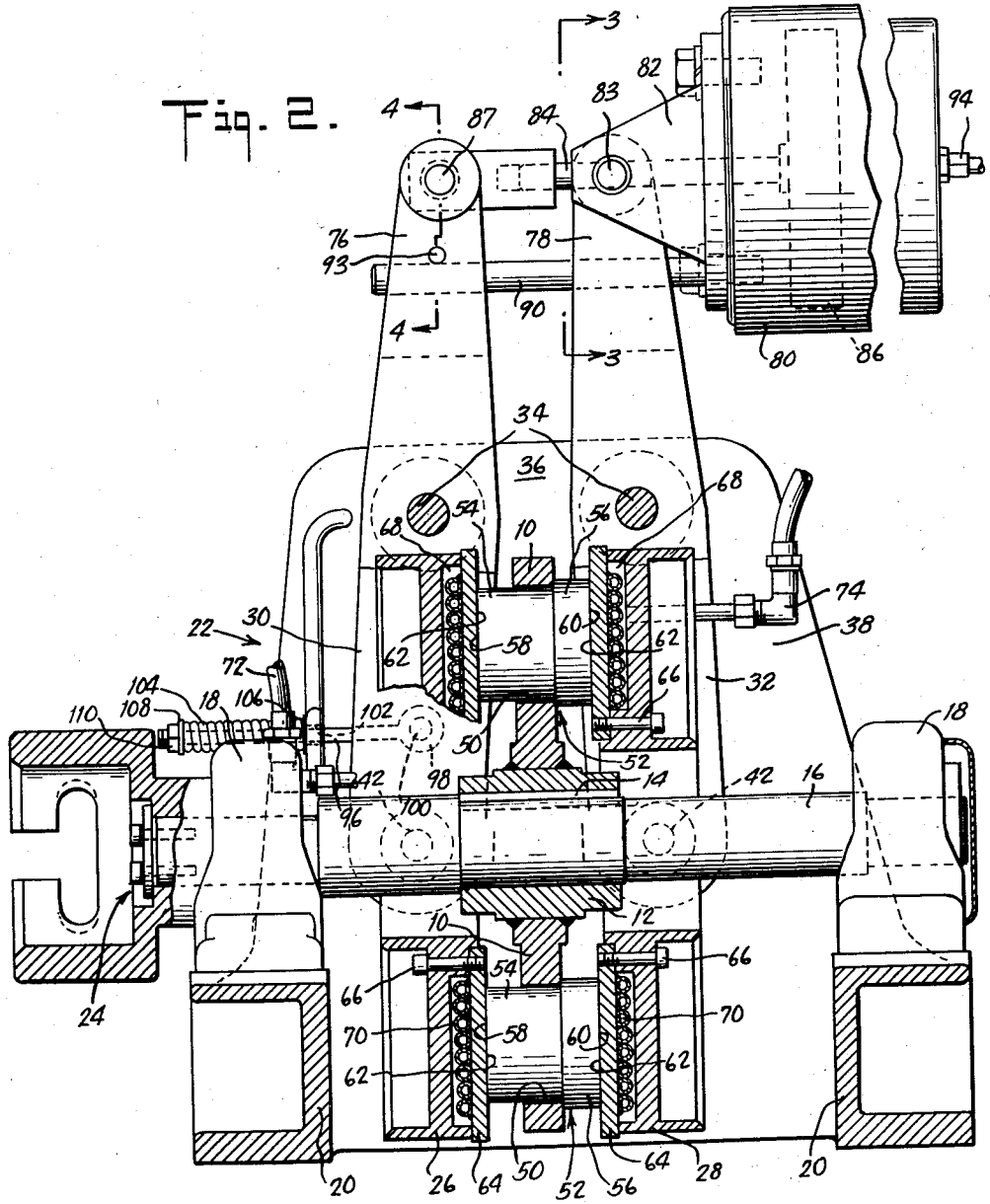
INVENTOR:
Gerrit De Gelleke
BY Robert Henderson
attorney

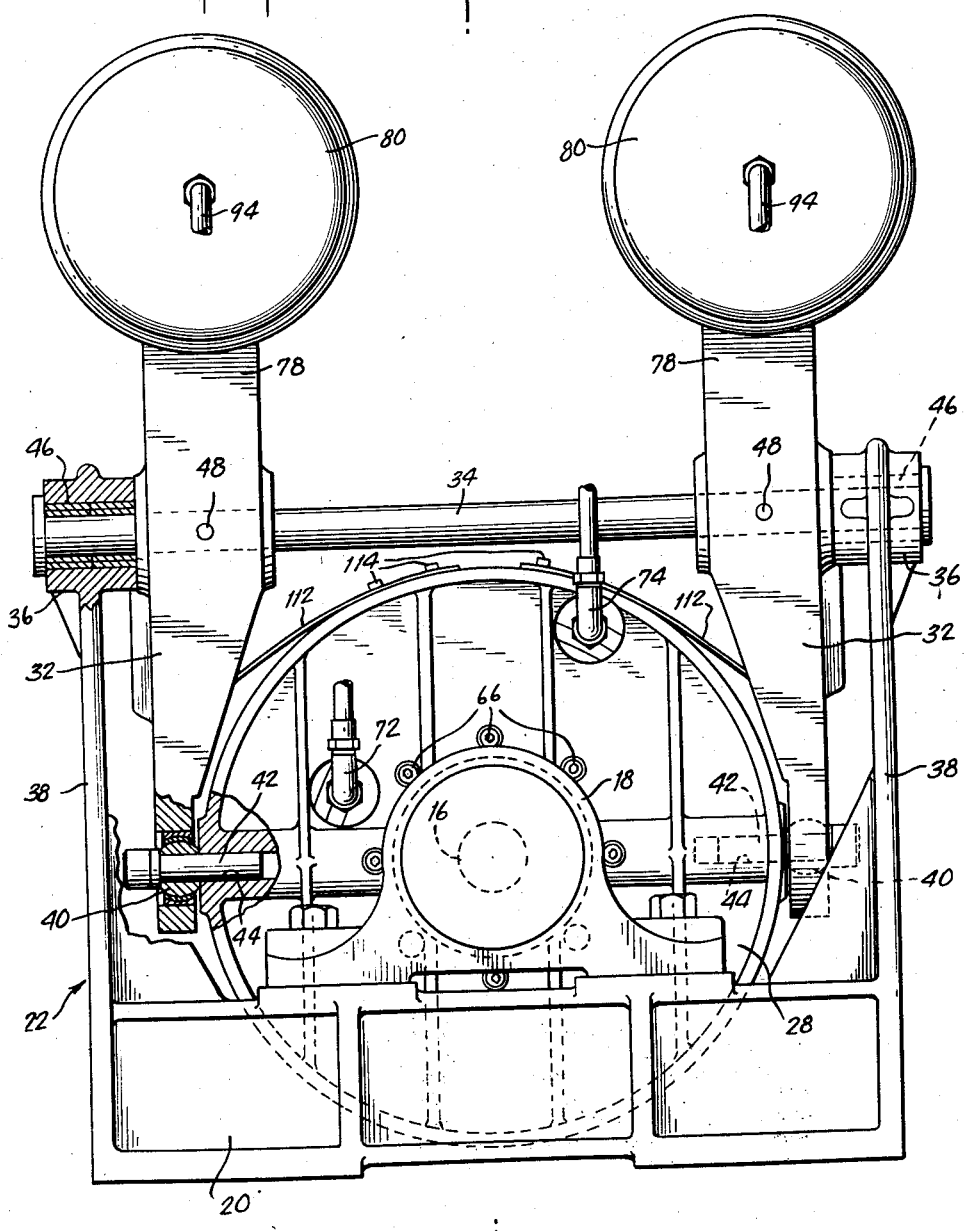

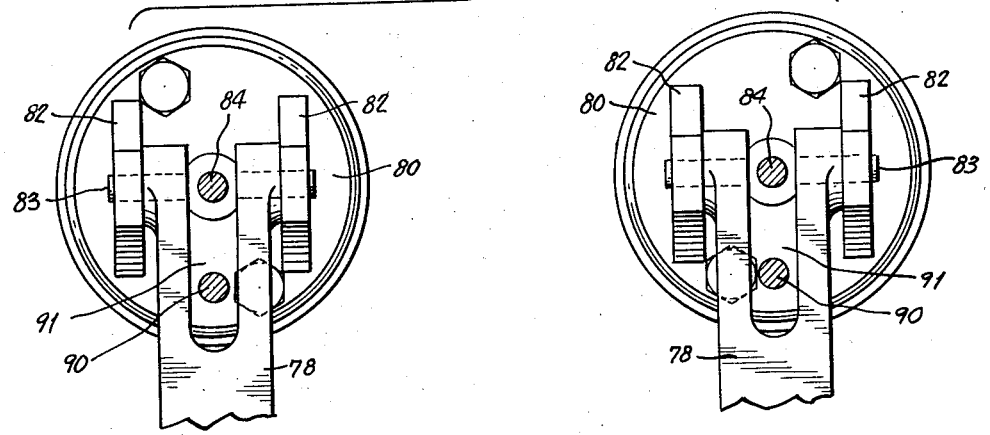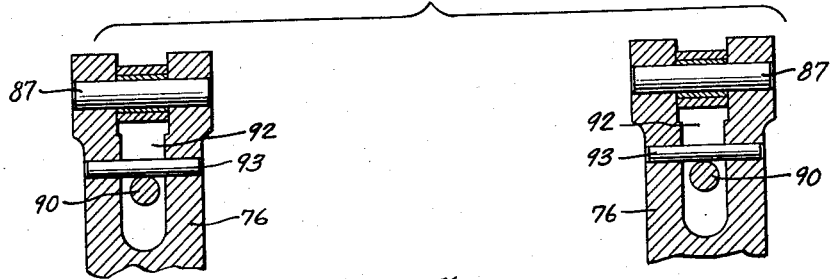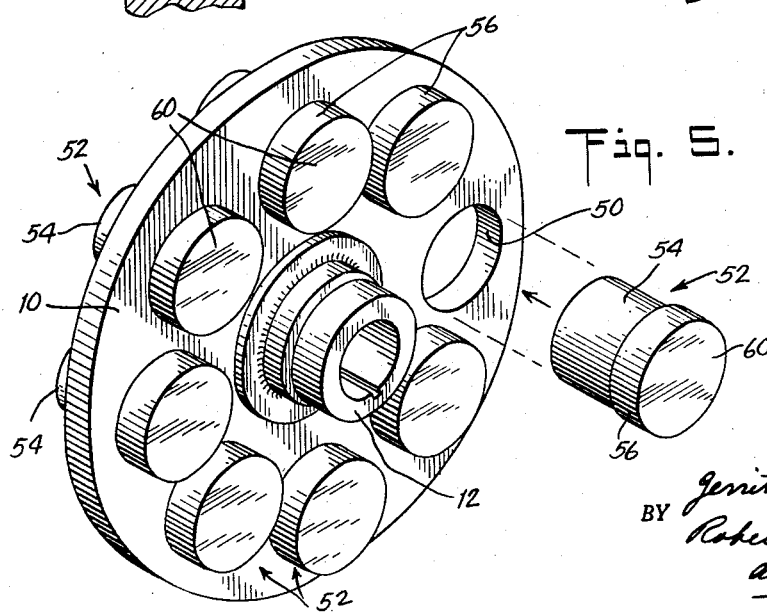

United States Patent Office 2,911,071
Patented Nov. 3, 1959

2,911,071
FLUID PRESSURE ACTUATED OPERATOR
FOR A DISK BRAKE

Gerrit De Gelleke, Troy Hills, N.J., assignor to Cameron Machine Company, Brooklyn, N.Y., a corporation of New York Application April 27, 1956, Serial No. 581,137

2 Claims. (Cl. 188—72)

This invention relates to improvements in brakes and, more particularly, to the type of brake wherein the braking surfaces are in a plane or planes which are substantially normal to the axis of rotation of a shaft or other rotary element to which the braking effect is to be applied. Such brakes are hereinafter referred to, for convenience, as plane or disk brakes.

While plane brakes heretofore developed have certain advantages, the fact that different areas of the braking or friction material are at different distances from the axis of rotation, and, hence, travel different distances per revolution of the shaft, gives rise to different friction conditions at said different areas and differing degrees of wear at said areas.

Another difficulty sometimes encountered in the use of plane brakes heretofore developed, as well as in some other types of brakes, is that the braking force becomes effective quite abruptly, thereby defeating efforts to achieve a desirable smooth braking effect.

Still another difficulty has been that replacement of worn braking material has been a difficult, time-consuming operation, causing inordinate expense not only in the actual replacement operation but also in the substantial length of time during which the brake and any related machines are shut down.

The principal objects of this invention are the provision of brakes in which said difficulties are substantially overcome. Those and other more or less obvious objects are realized through the present invention of which a single embodiment is disclosed in the accompanying drawings without, however, limiting the invention to that particular embodiment.

In the drawings:

Figure 1 is a side elevational view of a brake according to a preferred embodiment of this invention as seen from the right side of Fig. 2, some parts being broken away.

Fig. 2 is a vertical, central sectional view substantially on the line 2—2 of Fig. 1.

Fig. 3 is a largely elevational, fragmentary view as seen from the line 3—3 of Fig. 2.

Fig. 4 is a fragmentary, vertical sectional view substantially on the line 4—4 of Fig. 2.

Fig. 5 is a partially exploded, perspective view of a disk employed in the brake showing plugs of friction material associated therewith.

This brake operates on the principle of having a pair of coaxial, non-rotatable disks arranged for translational movement toward each other to engage therebetween and apply a braking force to a coaxial disk keyed to turn with a brake shaft. The latter is adapted for end-to-end connection with a shaft of a related machine to provide a desired braking effect for the latter shaft.

More particularly, a circular, rotatable brake disk 10 has a hub 12 secured by key 14 to a brake shaft 16 to constrain said disk to turn with said shaft. The shaft 16, toward its opposite ends, is rotatably supported in suitable bearings in pillow blocks 18 which are mounted on base portions 20 at opposite ends of a rigid frame 22. This frame, by suitable means, is adapted to be bolted down into a floor or pedestal in a position adjacent to a related machine with which the brake is intended to function. At one end, the brake shaft 16 is provided with a coupler 24 suitable for endwisely coupling the brake shaft to a shaft of the related machine in order to exert braking control upon the latter.

A pair of substantially similar, circular, centrally-apertured, non-rotatable brake disks 26, 28 are similarly suspended at opposite sides of and in coaxial relation to the disk 10, with the brake shaft 16 extending through their apertures with substantial clearance relatively thereto.

The suspension arrangement for the disks 26, 28 comprises, for each, a pair of substantially similar lever arms 30 (for disk 26) and 32 (for disk 28). The lever arms 30, 32 are borne, at intermediate points thereof, upon spaced, cross-shafts 34 supported at their ends in spans 36 constituting upper horizontal portions of similar, rigid, bridge-like side uprights 38 which are integral parts of the frame 22.

The disk 26 is pivotally supported at opposite side peripheral points, preferably in spherical bearings 40 carried in the lower ends of arms 30 and having pivot pins 42 extending therethrough and fitting tightly within horizontal bores 44 in the disk 26. The disk 28 is similarly pivotally supported at the lower ends of arms 32.

As illustrated, the shafts 34 are rock shafts, being rockable in bearings 46 in the spans 36, and the arms 30, 32 are secured to said shafts as by set-screws or pins 48, or by keys or other suitable means, to constrain the paired arms 30 and 32 to swing in unison with the rocking of their respective shafts. By the just-described arrangement, the disks 26, 28 are restrained against canting about their vertical axes in relation to the rotary disk 10.

As best seen in Figs. 2 and 5, the rotary disk is provided with plural, similar apertures 50, equidistantly spaced from each other in a concentric circle. The friction material employed for braking purposes is molded into the form of similar studs 52 having cylindrical shanks 54 which fit into the apertures 50 only loosely enough to be capable of turning freely therewithin. Each of the studs has an enlarged head 56 which, when the studs are inserted into the apertures in the disk 10 during assembling of the mechanism in the manner indicated by the arrow in Fig. 5, serves to limit the extent of such insertion. The dimensions of the parts of the studs 52 in relation to the thickness of the disk 10 are preferably such that, in the assembled mechanism, the shanks 54 protrude from one side of the disk to an extent about the same or slightly greater than the axial thickness of the heads 56.

The flat ends 58 of the shanks 54 of the friction studs 52 serve as friction surfaces at one side of the rotary brake disk 10 and the flat tops 60 of the studs' heads 56 serve as friction surfaces at the other side of said disk. Said friction surfaces are arranged to engage flat, facing surfaces 62 of similar, annular, preferably cast-iron alloy, friction plates 64 which are held by series of screws 66 to the non-rotatable disks 26, 28 in position to cover annular recesses 68 in said disks.

Spiral cooling tubes 70 of suitable metal are disposed within the recesses 68 and, preferably, are welded or brazed, throughout substantially their entire lengths, to the adjacent faces of the friction plates 64, thereby providing effective heat transfer from said plates to cooling fluid circulated through said tubes from a source of supply of such fluid with which said tubes are connected by input and output connections 72, 74.

It will be realized that, if simple hand levers are provided for rocking the shafts 34 in opposite directions, one could manually swing the arms 30 and 32 to cause the disks 26 and 28 to move toward each other, thereby causing very substantial frictional cooperation between the plates 64 and the studs 52 to slow down or stop the rotation of disk 10 and the brake shaft 16.

Mechanical operation of the brake is highly desirable, however, in order to enable the operation of the brake to be advantageously interrelated to the operation of a machine which the brake is arranged to control. For this purpose, the arms 30, 32, respectively, have upper extensions 76, 78, in the illustrated embodiment, and the upper ends of these arms are pivotally connected to suitable hydraulic or pneumatic actuators in the form of fluid-pressure cylinders 80, corresponding ends of which have rigid brackets 82 fixed thereon. These brackets and said cylinders are pivotally connected at 83 to the upper ends of extensions 78.

Piston rods 84 of pistons 86, in the cylinders 80, have their outer ends pivotally linked at 87 to the upper ends of extensions 76. The cylinders 80 are held in a more or less horizontal attitude by support rods 90 which, at one end, are rigidly fixed into the front ends of said cylinders and extend horizontally through slots 91 in extensions 78 with portions near their free ends extending through slots 92 in extensions 76 and slidably underlying cross-pins 93 which extend across intermediate portions of the latter slots. By reference to Fig. 2, it will be seen that the weight of the cylinders 80 would tend to cause them to pivot downwardly about their pivot points 83, but that such pivoting is prevented by the rods 90 which are restrained against material angular movement by the cross-pins 93.

If, in a structure as thus far described, fluid pressure is introduced into cylinders 80 at their back ends, through pipes 94, said cylinders, acting in opposition to their pistons 86, will forcefully urge the extensions 76 and 78 away from each other and, through the action of arms 30 and 32, will forcefully move the non-rotatable disks 26 and 28 toward each other to cause the friction plates 64 to press against the opposite end surfaces 58 and 60 of the friction studs 52. Thus, the rotary disk 10 and the brake shaft 16, as well as any shaft coupled to the latter, will be slowed down or stopped depending upon the forcefulness and duration of the coaction between the plates 64 and the studs 52.

The braking action, however, in the thus far detailed structure, would take place quite abruptly and possibly impose undesirable strain upon the brake and any related mechanism. To remedy this and yield a smooth braking action, means are preferably employed to cause the non-rotatable disks 26, 28 to apply a yielding braking effect upon the rotary disk 10 and to apply such braking effect in a gradual manner as compared to the abrupt braking action thus far detailed.

For the purpose just stated, long bolts 96, having eye-heads 98, are pivotally secured toward the lower ends of arms 30 by pivot pins 100 which are screwed into or otherwise rigidly fixed into said arms. These bolts extend outwardly (leftwardly as seen in Fig. 2) through and considerably beyond apertures 102 in uprights 38 of the frame 22. Coiled about the outer ends of the bolts 96 are springs 104 which are adjustably compressed between washers 106, 108 backed against the uprights 38 and spring-compression adjustment nuts 110 threaded on the ends of said bolts.

If the brake includes the means described in the next preceding paragraph, pressure in cylinders 80 will cause the described braking effect to be initially applied yieldingly because the compressive force of the springs 104 will directly oppose sudden initial braking coaction of non-rotatable disk 26 with rotary disk 10, while such initial braking coaction of non-rotatable disk 28 with the rotary disk is indirectly opposed by reason of the fact that the described piston-and-cylinder mechanism operates the disk 28 only through coaction with the arms 30 which respond to the action of the springs 104.

There is some advantage, also, in having somewhat flexible positioning plates 112 secured at their inner ends by screws 114 to top peripheral portions of the non-rotatable disks 26 and 28, these plates being illustrated only on disk 28 in Fig. 1. Said plates are arranged with their outer edges yieldably and frictionally engaging inside surfaces of arms 30 and 32. When the brake is first put into service, the disks 26 and 28 will find their proper angular attitude in relation to the arms 30 and 32; and the plates 112 frictionally engage the arms 30 and 32 with sufficient force to maintain the mentioned angularity while, nevertheless, permitting gradual changing of such angularity as the studs 52 wear down in service.

It will be evident that in initially assembling the brake or in replacing worn friction material, the studs 52 need only be inserted into the apertures 50 and will be held in place therein by the two disks 26 and 28; also, that worn studs may be very easily removed. This arrangement contrasts advantageously with prior brake disks onto which friction material is ordinarily riveted or otherwise fixed to the disk.

The use of the studs 52 in the described arrangement also assures that wear on the end surfaces 58 and 60 of said studs will be uniform. This is so because contact of the plates 64 with the surfaces 58 and 60 during rotation of the disk 10 causes the studs 52 to turn within the apertures 50 so that wear cannot become localized at any portions of said surfaces.

It should be obvious that the disclosed inventive concept may be utilized in various brake structures other than those disclosed herein without, however, departing from this invention as set forth in the following claims.

I claim:

1. A brake mechanism comprising a rotary shaft, a rotary disk on said shaft and constrained to turn therewith, a pair of non-rotatable plates supported at opposite sides of said disk, a pair of lever arms pivotally interlinked at intermediate points thereof, and a horizontally disposed fluid-pressure cylinder, pivotally connected to one end of one of said lever arms, having a piston therein pivotally connected to the corresponding end of the other of said lever arms, the other ends of said lever arms being arranged to coact with said plates to shift the latter toward and away from said disk in response to fluid-pressure variations in said cylinder, and said cylinder having a horizontal rod rigidly associated therewith and extending slidably beneath a pin in the lever arm to which said piston is pivotally connected to inhibit material pivoting of said cylinder about its point of pivotal connection to one of said arms whereby to support said cylinder.

2. A brake mechanism comprising a frame, a rotary shaft rigidly borne by said frame, a rotary disk on said shaft and constrained to turn therewith, braking means having a pair of non-rotatable plates at opposite sides of said disk, a pair of lever arms pivotally connected to said frame for pivotal movement in planes parallel to each other and to said shaft and coacting with said plates to urge the latter into frictional engagement with opposite faces of said disk, actuating means directly coacting oppositely and interdependently with said two lever arms of the pair to pivot the latter to establish braking coaction of said braking means with said disk, and yieldable means coacting between said frame and only one of said lever arms to yieldably restrain the plate, which is subject to the urging of said one lever arm, against movement toward said disk.

References Cited in the file of this patent

UNITED STATES PATENTS

| Number | Name | Date |
|---|---|---|
| 1,421,697 | Leah | July 4, 1922 |
| 1,436,915 | Shoemaker | Nov. 28, 1922 |
| 1,655,827 | Stanley | Jan. 10, 1928 |
| 1,734,598 | Schramm | Nov. 5, 1929 |
| 1,980,616 | Engel | Nov. 13, 1934 |
| 2,082,969 | Myers | June 8, 1937 |
| 2,107,091 | Swennes | Feb. 1, 1938 |
| 2,127,557 | Ells | Aug. 23, 1938 |
| 2,174,402 | Farmer | Sept. 26, 1939 |
| 2,250,988 | Eksergian | July 29, 1941 |
| 2,274,860 | Gaenssle | Mar. 3, 1942 |
| 2,464,680 | Gaenssle | Mar. 15, 1949 |
| 2,548,008 | Franklin | Apr. 10, 1951 |
| 2,667,946 | Helsten | Feb. 2, 1954 |
| 2,701,626 | Walther | Feb. 8, 1955 |
| 2,704,656 | Freer | Mar. 22, 1955 |
| 2,747,702 | Van Zelm | May 29, 1956 |
| 2,821,271 | Sanford | Jan. 28, 1958 |